United States Patent [19]
Mannava et al.

[11] Patent Number: 5,620,307
[45] Date of Patent: Apr. 15, 1997

[54] LASER SHOCK PEENED GAS TURBINE ENGINE BLADE TIP

[75] Inventors: Seetharamaiah Mannava; Albert E. McDaniel, both of Cincinnati; William D. Cowie, Xenia; Herbert Halila, Cincinnati; James E. Rhoda, Mason; Stephen J. Ferrigno, Cincinnati, all of Ohio

[73] Assignee: General Electric Company, Cincinnati, Ohio

[21] Appl. No.: 399,325

[22] Filed: Mar. 6, 1995

[51] Int. Cl.$^6$ ............................................. F01D 5/18
[52] U.S. Cl. ......................... 416/241 R; 219/121.68; 148/525; 148/903
[58] Field of Search ............... 416/241 R; 219/121.68, 219/121.69; 148/525, 565, 903

[56] References Cited

U.S. PATENT DOCUMENTS

| | | |
|---|---|---|
| 3,566,662 | 3/1971 | Champoux . |
| 3,576,070 | 4/1971 | Parsons ........................... 416/241 R |
| 3,689,176 | 9/1972 | Howell et al. . |
| 3,834,833 | 9/1974 | Faber et al. .................... 416/241 R |
| 3,850,698 | 11/1974 | Mallozzi et al. . |
| 4,002,403 | 1/1977 | Mallozzi et al. . |
| 4,060,769 | 11/1977 | Mallozzi et al. . |
| 4,214,355 | 7/1980 | Zelahy . |
| 4,247,254 | 1/1981 | Zelahy . |
| 4,401,477 | 8/1983 | Clauer et al. . |
| 4,411,597 | 10/1983 | Koffel et al. . |
| 4,426,867 | 1/1984 | Neal et al. ..................... 416/241 R |
| 4,539,461 | 9/1985 | Benedict et al. .................. 148/565 |
| 4,557,033 | 12/1985 | Champoux . |
| 4,708,752 | 11/1987 | Kar ................................ 148/525 |
| 4,726,104 | 2/1988 | Foster et al. . |
| 4,764,089 | 8/1988 | Strangman . |
| 4,878,953 | 11/1989 | Saltzman et al. . |
| 4,934,170 | 6/1990 | Easterbrook et al. . |
| 4,937,421 | 6/1990 | Ortiz, Jr. et al. . |
| 5,120,197 | 6/1992 | Brooks et al. .................. 416/241 R |
| 5,127,019 | 6/1992 | Epstein et al. . |
| 5,131,957 | 7/1992 | Epstein et al. . |
| 5,226,785 | 7/1993 | Narayana et al. . |
| 5,306,360 | 4/1994 | Bharti et al. . |
| 5,307,622 | 5/1994 | Ciokajlo et al. . |

FOREIGN PATENT DOCUMENTS

| | | |
|---|---|---|
| 0005187 | 1/1977 | Japan ............................. 416/241 R |
| 0273852 | 7/1988 | Japan ............................. 416/241 R |

OTHER PUBLICATIONS

"Jet Engines And Propulsion Systems For Engineers", GE Aircraft Engines for Human Resources Development, pp. 3–46—3–51, 1989.
American Machinist, "Laser Shocking Fatigue Life", by John A. Vaccari, pp. 62–64, Jul. 1992, A Penton Publication.

*Primary Examiner*—Edward K. Look
*Assistant Examiner*—Mark Sgantzos
*Attorney, Agent, or Firm*—Andrew C. Hess; Nathan D. Herkamp

[57] ABSTRACT

Gas turbine engine blade with a metallic airfoil having a radially outer tip extending chordwise between a leading edge and a trailing edge and at least one laser shock peened surface extending radially along at least a portion of the tip and a region having deep compressive residual stresses imparted by laser shock peening (LSP) extending into the airfoil from the laser shock peened surface.

10 Claims, 3 Drawing Sheets

5,620,307

LASER SHOCK PEENED GAS TURBINE ENGINE BLADE TIP

RELATED PATENT APPLICATIONS

The present Application deals with related subject matter in co-pending U.S. patent application Ser. Nos. 08/319,346, entitled "LASER SHOCK PEENED ROTOR COMPONENTS FOR TURBOMACHINERY", Ser. No. 08/373,133 entitled "LASER SHOCK PEENED FAN BLADE EDGES", Ser. No. 08/399,325 entitled "ON THE FLY LASER SHOCK PEENING", and Ser. No. 08/399,287, entitled "DISTORTION CONTROL OF LASER SHOCK PEENED BLADE EDGES".

BACKGROUND OF THE INVENTION

1. Field of the Invention

This invention relates to gas turbine engine rotor blades and, more particularly, to blade tips having localized compressive residual stresses imparted by laser shock peening.

2. Description of Related Art

Gas turbine engines such as aircraft gas turbine engine rotors often are designed so that during engine operation, the tip portion of the rotating blades rubs a stationary seal disposed within a shroud or casing circumscribing the blades so as to limit the leakage of working medium gases in the flow direction. These rotors operate at high rotational speeds that produce local high tensile and vibratory stress fields within blade tips and, particularly, make compressor and turbine blade tips susceptible to airfoil tip cracks followed by propagation and even failure (separation) of corners induced during the rubs. Vibrations may also be caused by vane wakes and inlet pressure distortions as well as other aerodynamic phenomena. Sensitivities and failure rates vary relative to the operating vibratory stresses, materials or degradation of properties and stress concentrations (due to tip wear and tear damage such as burrs, nicks, and tears) induced during rubs on the shroud or casing. A particularly troublesome combination occurs when all sensitivities combine to cause a failure in a relatively short time. Blades made from Titanium materials are notch sensitive, occasionally subject to relatively: severe rubs, and simultaneously may be subject to stress due to excitations of the blade in chordwise bending modes commonly referred to as "stripe modes", which has a potential for failing the blade under resonance in this mode. This can lead to separation and release of a corner of the blade. The mass size of this corner release is a function of the nodal pattern of the normal operating vibration mode. The corner release, in turn, impacts and damages downstream airfoils. The downstream damage often exceeds serviceable limits of the airfoils, therefore, necessitating engine removal for repairs and/or maintenance. Blades have been designed for easier maintenance and repair processes have been developed to repair worn and damaged blade tips. One short term solution is to cut back or crop the blade edges to raise the resonance frequency but this results in a loss of performance.

The burrs, nicks, and tears, hereinafter referred to as the tip damage, become the source of high stress concentrations or stress risers and may severely limit the life of the blades due to High Cycle Fatigue (HCF) from vibratory stresses discussed above. It is also expensive to refurbish and/or replace compressor and turbine blades and, therefore, any means to enhance the rotor capability and, in particular, to extend aircraft engine blade life is very desirable. The present invention is directed towards this end and provides a rotor blade with regions of deep compressive residual stresses imparted by laser shock peening along the blade's tip.

The region of deep compressive residual stresses imparted by laser shock peening of the present invention is not to be confused with a surface layer zone of a work piece that contains locally bounded compressive residual stresses that are induced by a hardening operation using a laser beam to locally heat and, thereby, harden the work piece such as that which is disclosed in U.S. Pat. No. 5,235,838, entitled "Method and Apparatus for Truing or Straightening Out of True Work Pieces". The present invention uses multiple radiation pulses from high power pulsed lasers to produce shock waves on the surface of a work piece similar to methods disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties". Laser peening as understood in the art and as used herein means utilizing a laser beam from a laser beam source to produce a strong localized compressive force on a portion of a surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". However, the prior art does not disclose blade tips of the type claimed by the present patent nor the methods of how to produce them. It is to this end that the present invention is directed.

The kinds of blade tip failures, even for engine designs in which vibration sensitivities are detected after numerous engines are already in service, can be eliminated by applying LSP to the blade tips. The compressive stresses from LSP can desensitize and neutralize the vibratory stresses and stress concentrations caused by the rub induced tip damage, therefore, preventing cracking and crack propagation.

SUMMARY OF THE INVENTION

The present invention provides a gas turbine engine blade having at least one laser shock peened surface along the tip of the blade and a region of deep compressive residual stresses imparted by laser shock peening (LSP) extending from the laser shock peened surface into the blade. Preferably, the blade has laser shock peened surfaces on both suction and pressure sides of the blade wherein both sides were simultaneously laser shock peened. The present invention can be used for new, used, and repaired compressor and turbine blades.

ADVANTAGES

Among the advantages provided by the present invention is the improved ability to safely build gas turbine engine blades designed to operate in high vibratory stress fields which can better withstand fatigue failure due to burrs, nicks, and tears formed from blade tip rubbing and have increased life over conventionally constructed blades. Another advantage of the present invention is that blades can be constructed with commercially acceptable life spans without increasing thicknesses as is conventionally done, thus, avoiding unwanted weight on the blade. Another advantage of constructing blades in accordance with the present invention is to cut down on the number of times a blade has to be repaired, refurbished, or replaced. The present invention makes it possible to provide new and refurbished compressor blades with enhanced capability and, in particular, extends the blade life in order to reduce the number of times that blades are refurbished and/or replaced. The present invention also allows aircraft engine blades to be designed with adequate margins by increasing vibratory stress capabilities to account for rubs or other blade tip damage without beefing up the area along the blade tips which increase the weight of the blades and engine. The present invention can be advantageously used to refurbish existing blades in order to ensure safe and reliable operation of older gas turbine engine blades while avoiding expensive redesign efforts or frequent replacement of suspect blades as is now often done or required.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
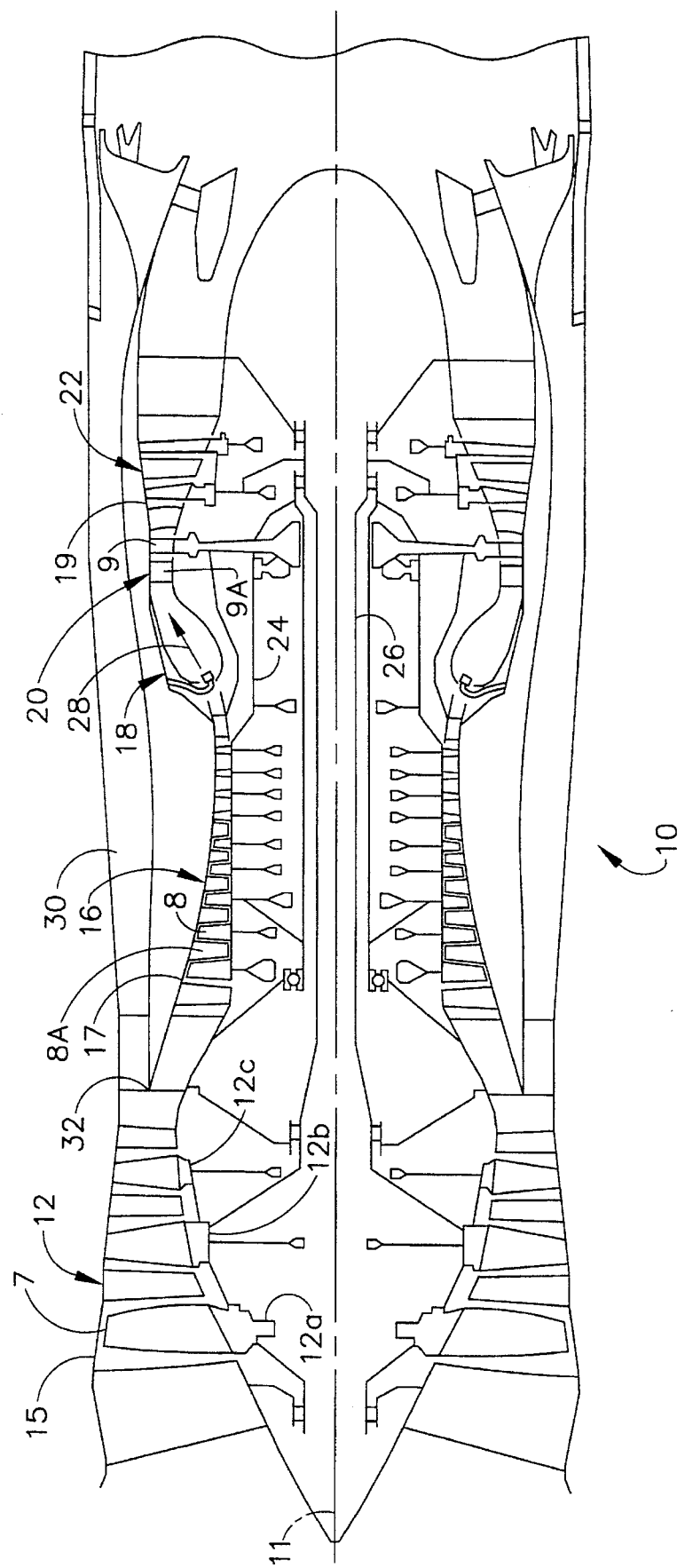
FIG. 1 is a cross-sectional illustrative view of an exemplary aircraft gas turbine engine in accordance with the present invention.

Illustrated in FIG. 1 is a schematic representation of an exemplary aircraft gas turbine engine 10 including a fan blade 7, a compressor blade 8, and a turbine blade 9 in accordance with the present invention. The gas turbine engine 10 is circumferentially disposed about an engine centerline 11 and has, in serial flow relationship, a fan section 12, a compressor section 16, a combustion section 18, a high pressure turbine 20, and a low pressure turbine 22. The combustion section 18, high pressure turbine 20, and low pressure turbine 22 are often referred to as the hot section of the engine 10. A high pressure rotor shaft 24 connects, in driving relationship, the high pressure turbine 20 to the high pressure compressor 16 and a low pressure rotor shaft 26 drivingly connects the low pressure turbine 22 to the fan section 12. Fuel is burned in the combustion section 18 producing a very hot gas flow 28 which is directed through the high pressure and low pressure turbines 20 and 22 respectively to power the engine 10. A portion of the air passing through the fan section 12 is bypassed around the high pressure compressor 16 and the hot section through a bypass duct 30 having an entrance or splitter 32 between the fan section 12 and the high pressure compressor 16. Many engines have a low pressure compressor (not shown) mounted on the low pressure rotor shaft 26 between the splitter 32 and the high pressure compressor 16. The fan section 12 is a multi-stage fan section as are many gas turbine engines as illustrated by three fan stages 12a, 12b, and 12c. The fan blades 7 of fan stages 12a, 12b, and 12c of the present invention are circumscribed by a fan casing 15 against which the blades seal and are designed to be used in a single stage #fan section or in any stage of a multi-stage fan section. The compressor blades 8 of the present invention are circumscribed by a compressor casing 17 against which the blades seal. The turbine blade 9 is circumscribed by a shroud 19 against which it seals and is illustrated as a squealer tip type that is sometimes used in the high pressure turbine 20. Occasionally, but repeatably, the fan blade 7, compressor blade 8, and the turbine blade 9 rub on the corresponding fan and compressor casings 15 and 17 respectively and shroud 19 causing tip damage 52, including burrs, nicks, and tears, to form on blade tips 38 and 138 illustrated in FIGS. 2 and 3. The compressor blades 8 are typically located downstream of a stage of compressor vanes 8A and the turbine blades 9 are typically located downstream of a stage of turbine vanes 9A.

Figure 3:
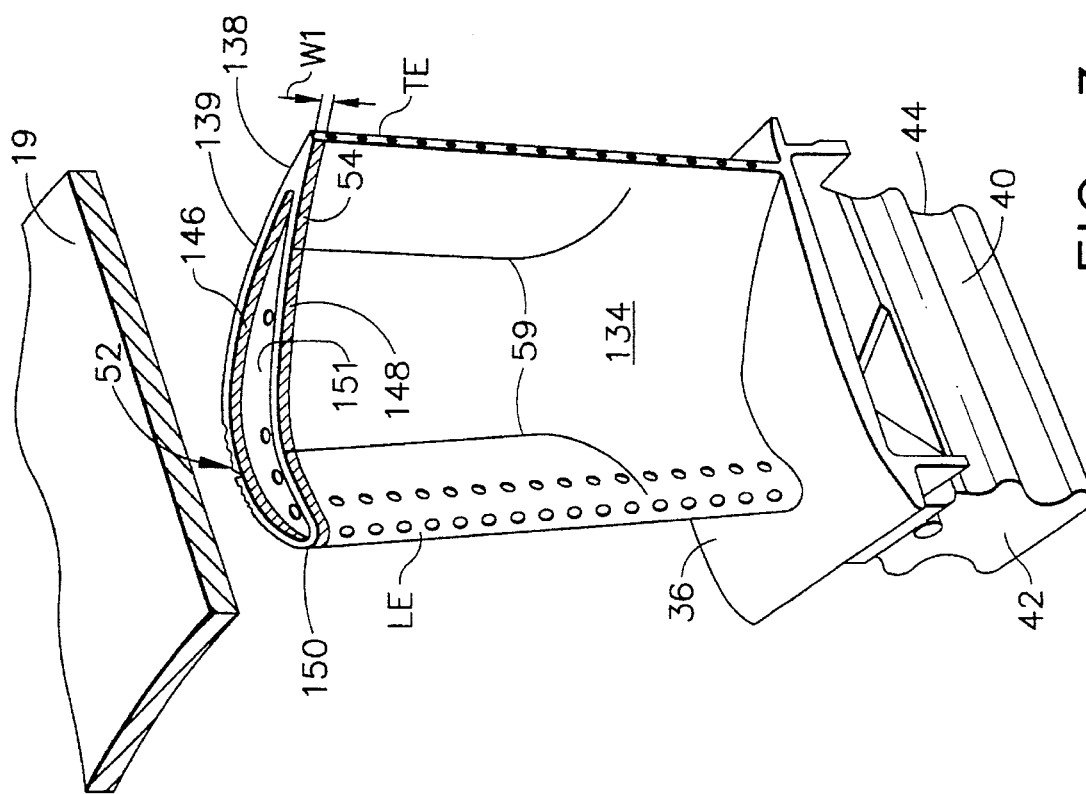
FIG. 3 is a perspective illustrative view of an aircraft gas turbine engine turbine blade in accordance with the present invention.
Figure 2:
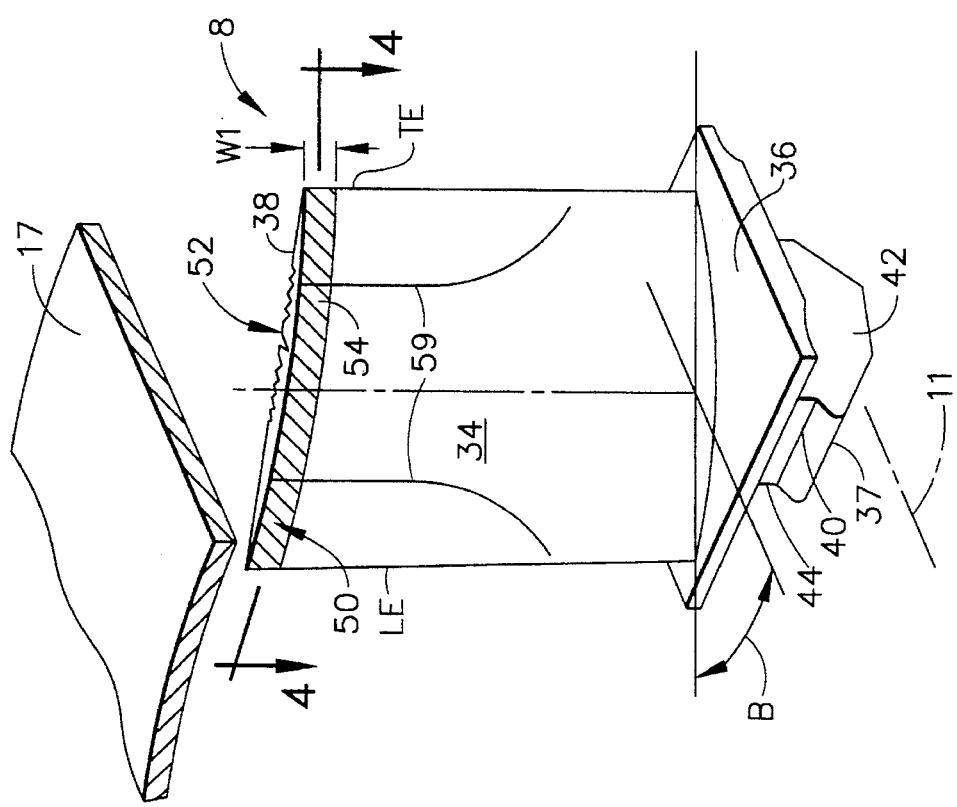
FIG. 2 is a perspective illustrative view of an exemplary aircraft gas turbine engine compressor blade in accordance with the present invention.
Figure 4:
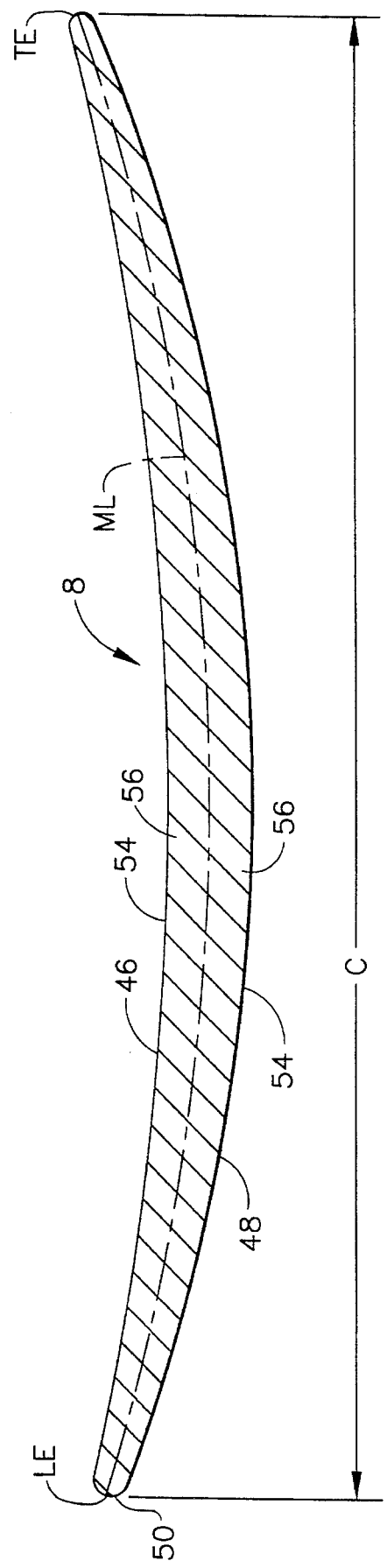
FIG. 4 is a cross sectional view through the compressor blade taken along line 4—4 as illustrated in FIG. 2.

Referring to FIGS. 2 and 3, the compressor blade 8 includes an airfoil 34 extending radially outward from a blade platform 36 to a blade tip 38. The compressor blade 8 for the purposes of the remainder of this patent specification also generally represents the fan blade 7 constructed in accordance with the present invention. The compressor blade 8 includes a root section 40 extending radially inward from the platform 36 to a radially inward end 37 of the root section 40. At the radially inward end 37 of the root section 40 is a blade root 42 which is connected to the platform 36 by a blade shank 44. A chord C of the airfoil 34 is the line between the leading edge LE and trailing edge TE at each cross section of the blade as illustrated in FIG. 4. The airfoil 34 extends in the chordwise direction between a leading edge LE and a trailing edge TE of the airfoil. A pressure side 46 of the airfoil 34 faces in the general direction of rotation as indicated by the arrow and a suction side 48 is on the other side of the airfoil and a mean-line ML is generally disposed midway between the two faces in the chordwise direction. Often the airfoil 34 also has a twist whereby a chord angle B varies from the platform 36 to the tip 38. The chord angle B is defined as the angle of the chord C with respect to the engine centerline 11.

Referring again to FIG. 2, compressor blade 8 has a tip section 50 that extends along the tip 38 of the airfoil 34 from the leading LE to the trailing edge TE. The airfoil 34 is subject to vibrations generated during engine operation and the tip damage 52 operate as high cycle fatigue stress risers producing additional stress concentrations around them. This stress may be due to excitations of the blade in chordwise bending modes commonly referred to as "stripe modes". The dominant failure mode at the blade tip 38 may not always be the maximum stress mode but rather a lower stress mode or combination of modes that exist for longer durations over the engine's mission. By way of example, the predetermined nodal line 59 at the blade tip 38 illustrated in FIG. 2 corresponds to excitation at N PR (Per Rev or Per Revolution) of the engine's rotor where N corresponds to the number of compressor vanes 8A in front of or behind the blade. The tip damage 52 located in this area of the blade tip 38 has the greatest potential for failing the blade under these excitations. The tip section 50 includes a predetermined first width W1 such that the tip section 50 encompasses any burrs 52 that may occur along the tip 38 of the airfoil 34.

To counter fatigue failure of portions of the blade along possible crack lines that can develop and emanate from the burrs along the blade tip 38 at least one and preferably both of the pressure side 46 and the suction side 48 have a laser shock peened surface 54 and a pre-stressed region 56 having deep compressive residual stresses imparted by laser shock peening (LSP) extending into the airfoil 34 from the laser shock peened surface in the tip section 50 along the blade tip 38 as seen in FIG. 2. Preferably, the pre-stressed regions 56 are coextensive with the blade tip 38 in the chordwise direction to the full extent of width W1 and are deep enough into the airfoil 34 to coalesce for at least a part of the width W1.

The laser beam shock induced deep compressive residual stresses in the compressive pre-stressed regions 56 are generally about 50–150 KPSI (Kilo Pounds per Square Inch) extending from the laser shock surfaces 54 to a depth of about 20–50 mils into laser shock induced compressive residually pre-stressed regions 56. The laser beam shock induced deep compressive residual stresses are produced by repetitively firing a high energy laser beam that is focused on surface 54 which is covered with paint to create peak power densities having an order of magnitude of a gigawatt/cm$^2$. The laser beam is fired through a curtain of flowing water that is flowed over the surface 54 and the paint is ablated generating plasma which results in shock waves on the surface of the material. These shock waves are re-directed towards the painted surface by the curtain of flowing water to generate travelling shock waves (pressure waves) in the material below the painted surface. The amplitude and quantity of these shock waves determine the depth and intensity of the compressive stresses. The paint is used to protect the target surface and also to generate plasma. Ablated paint material is washed out by the curtain of flowing water. This and other methods for laser shock peening are disclosed in greater detail in U.S. patent application Ser. No. 08/319,346, entitled "LASER SHOCK PEENED ROTOR COMPONENTS FOR TURBOMACHINERY", and in U.S. patent application Ser. No. 08/399,325, entitled "ON THE FLY LASER SHOCK PEENING" which are both incorporated herein by reference.

Referring to FIG. 3, the turbine blade 9, illustrated in accordance with another embodiment of the present invention, has a squealer tip section 150 that extends along the tip 138 of a turbine airfoil 134 from the leading LE to the trailing edge TE. The squealer tip 138 includes a radially extending wall 139 that circumscribes the turbine airfoil 134 at the radially outer end of the squealer tip section 150 forming an open cavity 151 within the wall. The turbine airfoil 134 is also subject to vibrations generated during engine operation and the tip damage 52 operates as a high cycle fatigue stress riser producing additional stress concentrations around the tip damage. This stress may be due to excitations o the blade in chordwise bending modes commonly referred to as "stripe modes". The dominant failure mode at the blade squealer tip 138 may not always be the maximum stress mode but rather a lower stress mode or combination of modes that exist for longer durations over the engine's mission. By way of example the predetermined nodal line 59 at the squealer blade tip 138 illustrated in FIG. 3 corresponds to excitation at N PR (Per Rev or Per Revolution) of the engine's rotor where N corresponds to the number of turbine vanes 9A in front of or behind the blade. The tip damage 52 located in this area of the blade squealer tip 138 has the greatest potential for failing the blade under these excitations. The squealer tip section 150 includes a predetermined first width W1 such that the squealer tip section 150 encompasses any tip damage 52 that may occur on the wall 139 along the squealer tip 138 of the turbine airfoil 134.

To counter fatigue failure of portions of the turbine blade tip squealer section 150 along possible crack lines that can develop and emanate from the burrs along the blade squealer tip 138 at least one and preferably the wall 139, along both an inner side 146 and an outer side 148, has a laser shock peened surface 54 and a pre-stressed region 56 having deep compressive residual stresses imparted by laser shock peening (LSP) extending into the turbine airfoil 134 from the laser shock peened surface in the squealer tip section 150 along the blade squealer tip 138 as seen in FIG. 3 and similar to the region 56 shown in FIG. 4. Preferably, the pre-stressed regions 56 are coextensive with the blade squealer tip 138 in chordwise direction to the full extent of width W1 and are deep enough into the turbine airfoil 134 to coalesce for at least a part of the width W1.

While the preferred embodiment of the present invention has been described fully in order to explain its principles, it is understood that various modifications or alterations may be made to the preferred embodiment without departing from the scope of the invention as set forth in the appended claims.

We claim:

1. A gas turbine engine blade comprising:

a metallic airfoil having a pressure side, a suction side, and a radially outer tip extending chordwise between a leading edge and a trailing edge of said airfoil, at least one laser shock peened surface on at least one side of said airfoil, said laser shock peened surface extending chordwise along at least a portion of said tip and extending radially from said tip, and a region having deep compressive residual stresses imparted by laser shock peening (LSP) extending into said airfoil from said laser shock peened surface.

2. A gas turbine engine blade as claimed in claim 1 further comprising:

a first laser shock peened surface located along a pressure side of said airfoil, a first region having deep compressive residual stresses imparted by laser shock peening (LSP) extending into said airfoil from said first laser shock peened surface, a second laser shock peened surface located along a suction side of said leading edge, a second region having deep compressive residual stresses imparted by laser shock peening (LSP) extending into said airfoil from said second laser shock peened surface, and said first and second laser shock peened surfaces extending chordwise along at least a portion of said tip and extending radially from said tip.

3. A gas turbine engine blade as claimed in claim 2 wherein said laser shock peened regions extending into said airfoil from said laser shock peened surfaces are formed by simultaneously laser shock peening both sides of said airfoil.

4. A gas turbine engine blade as claimed in claim 3 wherein said gas turbine engine blade is a repaired gas turbine engine blade.

5. A gas turbine engine blade as claimed in claim 1 wherein said gas turbine engine blade is a repaired gas turbine engine blade.

6. A gas turbine engine blade as claimed in claim 1 wherein said gas turbine engine blade is a turbine blade.

7. A gas turbine engine blade as claimed in claim 1 wherein said turbine blade is a squealer turbine blade further comprising a radially extending wall that includes said tip and circumscribes said airfoil at a radially outer end of said airfoil forming an open cavity within said wall.

8. A gas turbine engine blade as claimed in claim 7 further comprising:

a first laser shock peened surface located along an inner side of said wall with respect to said cavity, a first region having deep compressive residual stresses imparted by laser shock peening (LSP) extending into said wall from said first laser shock peened surface, a second laser shock peened surface located on an outer side of said wall with respect to said cavity, a second region having deep compressive residual stresses imparted by laser shock peening (LSP) extending into said airfoil from said second laser shock peened surface, and said first and second laser shock peened surfaces extending chordwise along at least a portion of said tip and extending radially inward from said tip.

9. A gas turbine engine blade as claimed in claim 8 wherein said first and second laser shock peened surfaces and regions extend entirely around said wall.

10. A gas turbine engine blade as claimed in claim 9 wherein said laser shock peened regions extending into said airfoil from said laser shock peened surfaces are formed by simultaneously laser shock peening said inner and outer sides of said wall.

* * * * *